(12) United States Patent  (10) Patent No.: US 9,087,243 B2
Kamei                      (45) Date of Patent:     Jul. 21, 2015

(54) ANALYSIS APPARATUS, ANALYSIS METHOD, AND STORAGE MEDIUM

(71) Applicant: CANON KABUSHIKI KAISHA, Tokyo (JP)

(72) Inventor: Yoichi Kamei, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 13/715,892

(22) Filed: Dec. 14, 2012

(65) Prior Publication Data

US 2013/0188829 A1    Jul. 25, 2013

(30) Foreign Application Priority Data

Jan. 24, 2012  (JP) ................. 2012-012435

(51) Int. Cl.
    *G06K 9/00*       (2006.01)
(52) U.S. Cl.
    CPC .................. *G06K 9/00771* (2013.01)
(58) Field of Classification Search
    CPC ................................ G06K 9/00771
    USPC ......................................... 382/103
    See application file for complete search history.

(56) References Cited

U.S. PATENT DOCUMENTS

| | | | |
|---|---|---|---|
| 5,028,921 A * | 7/1991 | Potter ........................ | 340/939 |
| 5,136,621 A * | 8/1992 | Mitchell et al. ............. | 377/24.2 |
| 7,003,798 B2 | 2/2006 | Yamakawa et al. | |
| 2008/0025593 A1* | 1/2008 | Ajioka ........................ | 382/141 |
| 2010/0165417 A1* | 7/2010 | Hayakawa ................... | 358/453 |
| 2012/0128212 A1* | 5/2012 | Almbladh .................... | 382/107 |

FOREIGN PATENT DOCUMENTS

JP    2005-141695 A    6/2005

* cited by examiner

*Primary Examiner* — Stephen R Koziol
*Assistant Examiner* — Delomia Gilliard
(74) *Attorney, Agent, or Firm* — Fitzpatrick, Cella, Harper & Scinto

(57) ABSTRACT

An analysis apparatus analyzes an image and performs counting of the number of object passages. The analysis apparatus executes the counting and outputs the execution status of the counting.

14 Claims, 3 Drawing Sheets

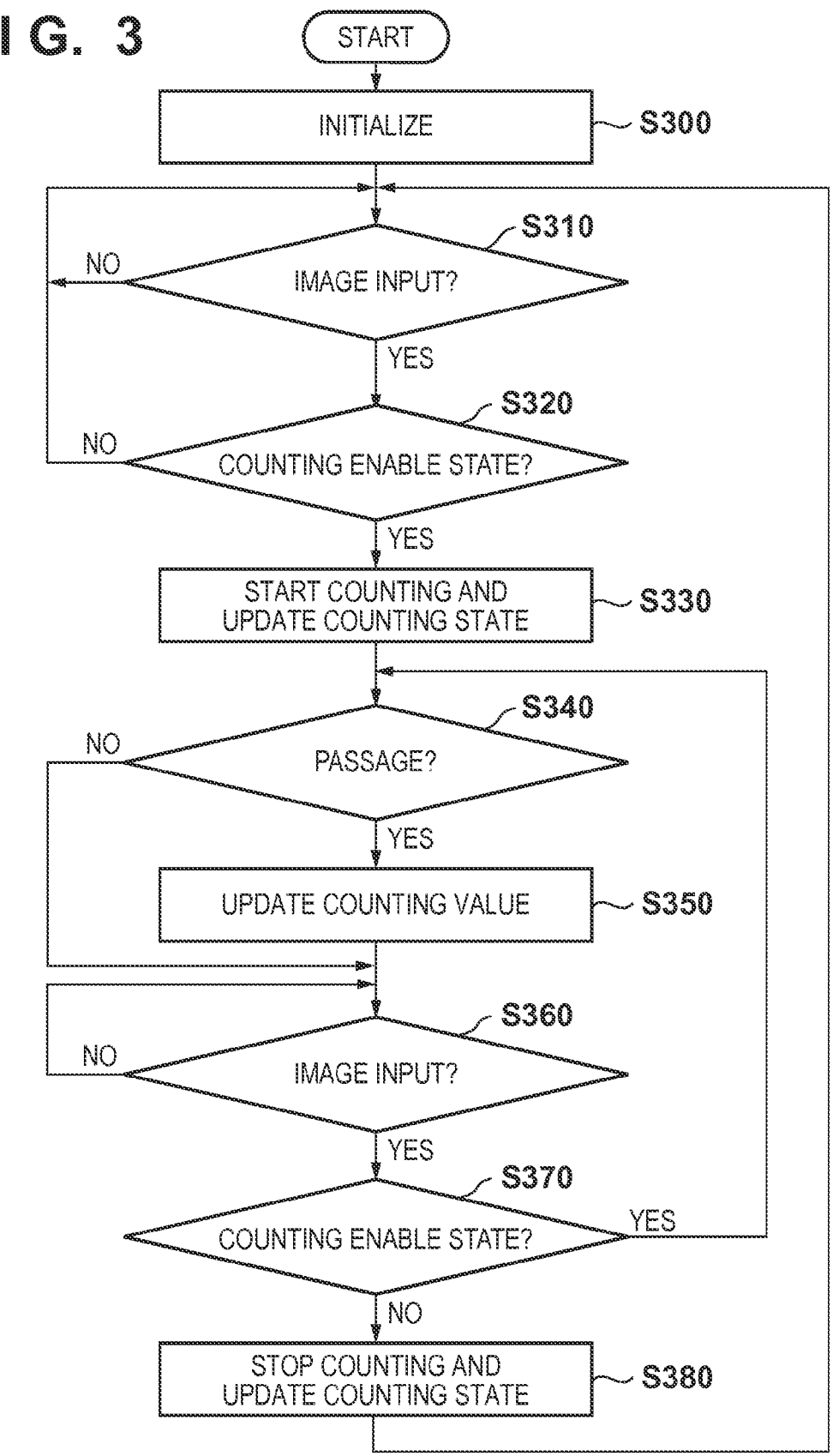

ANALYSIS APPARATUS, ANALYSIS METHOD, AND STORAGE MEDIUM

BACKGROUND OF THE INVENTION

1. Field of the Invention

The present invention relates to an analysis apparatus and method of analyzing an image to count the number of passing objects.

2. Description of the Related Art

Counting persons or vehicles going along a road or passing through the doorway of a store has become prevalent. Detailed counting methods include, for example, visually counting using a tally counter, and counting by combining an infrared sensor and counting software on a personal computer (PC). Also widely conducted are capturing a store or a road by a surveillance camera and recording an image. When the captured image is analyzed by a camera or a recording apparatus, and persons or vehicles passing on the image are counted, the cost is low, and any other equipment is not necessary.

In surveillance cameras, parameters such as the angle of view and the capturing direction are fixed or variable. A surveillance camera having variable parameters can cyclically capture a wide range, capture an enlarged image of a portion where an abnormality has occurred, or track and capture a suspicious person. However, the advantages of the surveillance camera with variable parameters hinder counting the number of passing objects. That is, if a passing person or vehicle is located outside the capturing range, it cannot be counted. Even within the capturing range, if the angle or magnification changes, the image analysis condition changes, and a predetermined counting accuracy cannot be obtained.

To prevent this, for example, Japanese Patent Laid-Open No. 2005-141695 discloses a monitor system that prohibits the operator from changing parameters during counting. This patent literature also discloses a monitor system that causes the operator to select whether to interrupt counting if a parameter change operation has been done during counting. When the operator selects to interrupt, the counting is interrupted.

However, a parameter change operation for, for example, causing a surveillance camera to capture an enlarged image of a portion where an abnormality has occurred is often highly urgent. Hence, when the operator is selecting whether to interrupt, the system may fail in capturing an important object at a sufficient angle of view. For this reason, an operation of changing a parameter such as an angle of view needs to be immediately executable independently of the counting state.

The parameter operation is performed at the expense of counting accuracy, as described above. However, if the frequency of counting interrupt by the parameter operation in case of abnormality occurrence is low, correct counting can be performed during most of the time. Hence, the task is how to handle the result of correct counting.

SUMMARY OF THE INVENTION

According to one aspect of the present invention, there is provided an analysis apparatus for analyzing an image and performing counting of the number of object passages, comprising: an execution unit configured to execute the counting; and an output unit configured to output an execution status of the counting by the execution unit.

Further features of the present invention will be apparent from the following description of exemplary embodiments with reference to the attached drawings.

BRIEF DESCRIPTION OF THE DRAWINGS

FIG. 3 is a flowchart showing the operation of an image analysis unit included in the image analysis apparatus.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Arrangement)

Figure 1:
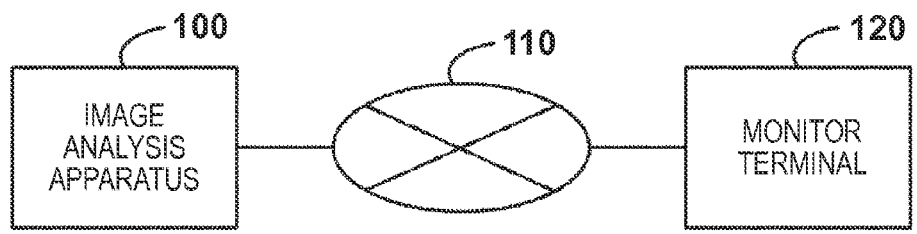
FIG. 1 is a block diagram showing an example of the arrangement of a monitor system.

FIG. 1 is a block diagram showing an example of the arrangement of a monitor system according to this embodiment. Referring to FIG. 1, the monitor system includes an image analysis apparatus 100, a network 110, and a monitor terminal 120. The image analysis apparatus 100 and the monitor terminal 120 are connected to each other via the network 110.

The monitor terminal 120 controls the image analysis apparatus 100 via the network 110 based on a user operation. The monitor terminal 120 also receives, via the network 110, a passing object counting result that is the analysis result of the image analysis apparatus 100, and displays, for the user, the counting result via a display (not shown) of the monitor terminal 120. The monitor terminal 120 is, for example, a personal computer (PC) that can execute an image control/display program and an analysis control/display program.

The image control/display program detects a user operation, converts the operation into a control command corresponding to the contents to the detected operation, transmits the control command to the image analysis apparatus 100, and receives and displays a response from the image analysis apparatus 100. For example, the image control/display program controls at least one of the angle of view in image capturing, the compression method, and the transmission method of the image analysis apparatus 100. The analysis control/display program controls the image analysis apparatus 100 concerning, for example, the position to determine the passage of an object on an image or the direction of passage, and receives and displays a response from the image analysis apparatus 100.

The medium such as a wired or wireless system, the scale such as a LAN or the Internet, and the communication protocol are not particularly limited in the network 110 as long as it enables communication between the image analysis apparatus 100 and the monitor terminal 120. The image analysis apparatus 100 will be described later.

(Arrangement of Image Analysis Apparatus 100)

Figure 2:
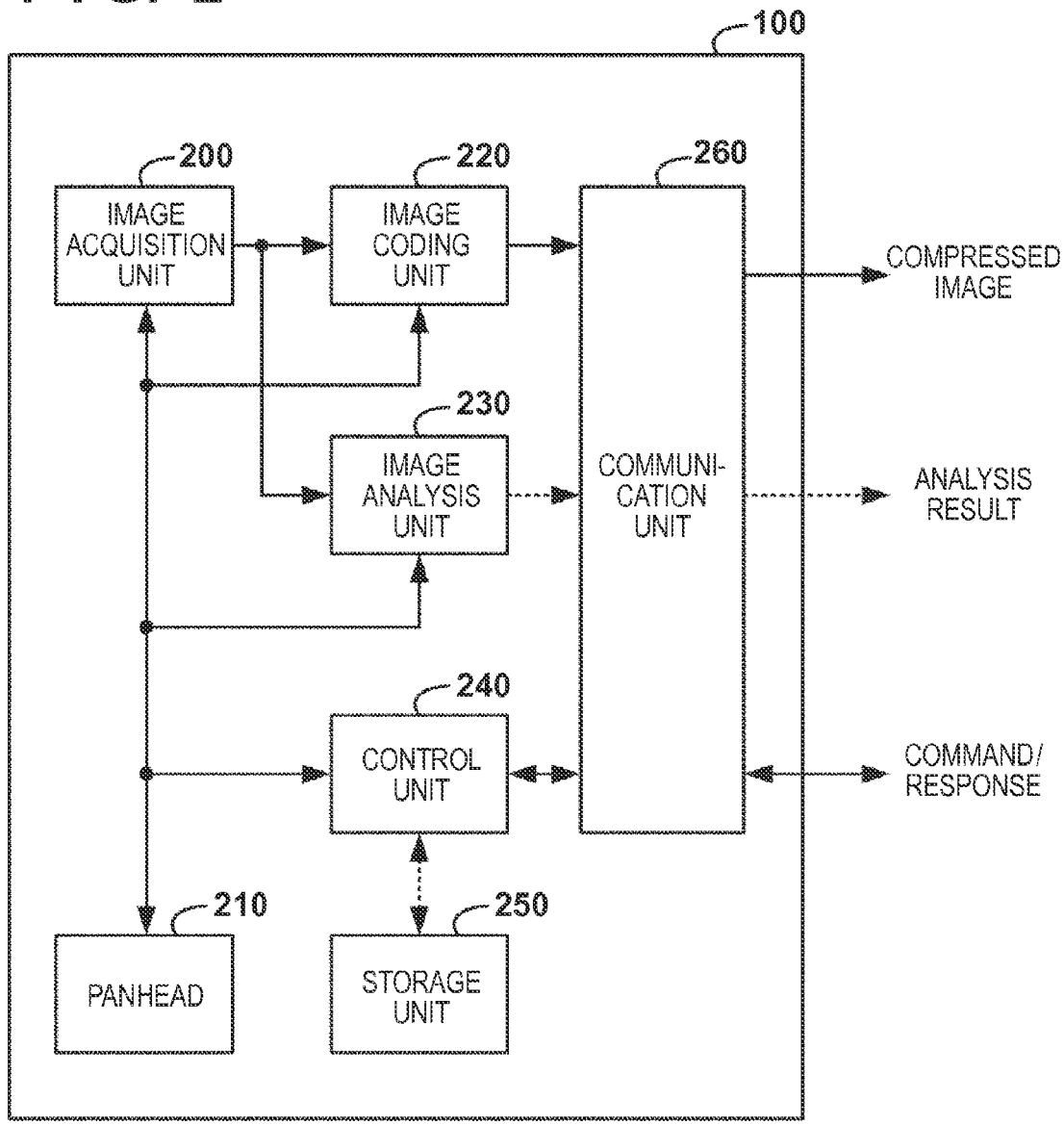
FIG. 2 is a block diagram showing the arrangement of an image analysis apparatus.

FIG. 2 is a block diagram showing the arrangement of the image analysis apparatus 100 according to this embodiment. In the example shown in FIG. 2, the image analysis apparatus 100 includes an image acquisition unit 200, a panhead 210, an image coding unit 220, an image analysis unit 230, a control unit 240, a storage unit 250, and a communication unit 260.

The image analysis apparatus 100 acquires an image, and outputs a compressed image and an analysis result.

The image acquisition unit 200 continuously receives images captured by a lens and a sensor such as a CCD or CMOS sensor, performs analog-to-digital conversion or size conversion based on an instruction from the control unit 240 to be described later, and outputs the images to the image coding unit 220 and the image analysis unit 230. The image acquisition unit 200 also sets a capturing magnification based on an instruction from the control unit 240.

For example, at the time of initialization, the control unit 240 instructs the image acquisition unit 200 to set the capturing magnification of the image acquisition unit 200 to a predetermined capturing magnification that is stored in the storage unit 250 and used to execute image analysis. The image acquisition unit 200 then maintains the predetermined capturing magnification stored in the storage unit 250 and used to execute image analysis unless an instruction is received from the control unit 240. On the other hand, for example, if the communication unit 260 has received a control command from the monitor terminal 120, the capturing magnification of the image acquisition unit 200 is changed in accordance with an instruction from the control unit 240. After the change of the capturing magnification, if an instruction to return the capturing magnification to the capturing magnification at the time of initialization upon, for example, receiving a control command from the monitor terminal 120, the image acquisition unit 200 may return the capturing magnification to the predetermined capturing magnification stored in the storage unit 250 and used to execute image analysis.

The panhead 210 stacks the image acquisition unit 200 on it and sets the capturing direction based on an instruction from the control unit 240. For example, at the time of initialization, the control unit 240 instructs the panhead 210 to set the capturing direction of the panhead 210 to a predetermined capturing direction that is stored in the storage unit 250 and used to execute image analysis. The panhead 210 then maintains the predetermined capturing direction stored in the storage unit 250 and used to execute image analysis unless an instruction is received from the control unit 240. On the other hand, for example, if the communication unit 260 has received a control command from the monitor terminal 120, the capturing direction is changed in accordance with an instruction from the control unit 240. After the change of the capturing direction, if an instruction to return the capturing direction to the capturing direction at the time of initialization upon, for example, receiving a control command from the monitor terminal 120, the panhead 210 may return the capturing direction to the predetermined capturing direction stored in the storage unit 250 and used to execute image analysis.

That is, the capturing magnification of the image acquisition unit 200 and the capturing direction of the panhead 210 are controlled. For example, at the time of initialization, these functional units operate to obtain a predetermined capturing range used to execute image analysis.

The image coding unit 220 codes an image input from the image acquisition unit 200 using an image coding method and a compression ratio by an instruction from the control unit 240 to be described later, and outputs the image to the communication unit 260. Note that the image coding method is, for example, JPEG or MPEG coding. The image analysis unit 230 executes image analysis and counts the number of passing objects on the image input from the image acquisition unit 200 based on an instruction from the control unit 240 to be described later, and outputs the analysis result to the communication unit 260. The communication unit 260 outputs the analysis result to the monitor terminal 120 via the network 110. A detailed arrangement and operation will be described later.

The control unit 240 receives, via the communication unit 260, a command input by the user from the monitor terminal 120. The control unit 240 controls the operations of the image acquisition unit 200, the panhead 210, the image coding unit 220, and the image analysis unit 230 described above, and returns responses from these functional units to the monitor terminal 120 via the communication unit 260. If the command from the user is transmission of an image captured by the image acquisition unit 200, the control unit 240 controls the image coding unit 220 to cause the communication unit 260 to transmit a compressed image that is the output of the image coding unit 220. If the command from the user is transmission of the analysis result of the image analysis unit 230, the control unit 240 controls the image analysis unit 230 to cause the communication unit 260 to transmit the analysis result of the image analysis unit 230.

In addition, the control unit 240 controls the image acquisition unit 200 and the panhead 210 to track an object detected by the image analysis unit 230. The control unit 240 manages the current control statuses of the image acquisition unit 200 and the panhead 210, and in response to a query from the image analysis unit 230, transmits the current control statuses of the image acquisition unit 200 and the panhead 210 to the image analysis unit 230. The control unit 240 also controls the image acquisition unit 200 and the panhead 210 in response to a request from the image analysis unit 230.

The control unit 240 is connected to the storage unit 250. If the command from the user is a setting saving command, the control unit 240 saves the operation settings of the image acquisition unit 200, the panhead 210, the image coding unit 220, and the image analysis unit 230. The saved settings are used for, for example, the default operations of the respective functional units which are used when no control command is received from the user. Upon receiving a setting read command from the user, the control unit 240 transmits the operation settings of the image acquisition unit 200, the panhead 210, the image coding unit 220, and the image analysis unit 230, which are saved in the storage unit 250, to the monitor terminal 120 as a response. The control unit 240 also responds to an operation setting query from the image analysis unit 230.

Note that in the above-described embodiment, both the image acquisition unit 200 and the panhead 210 are included in the image analysis apparatus 100. However, the present invention is not limited to this. For example, the image analysis apparatus 100 may be connected to the image acquisition unit 200 and the panhead 210 via, for example, a network, instead of including them. In this case, the image analysis apparatus 100 may send an instruction from the control unit 240 via the network or wiring.

The communication unit 260 is connected to the network 110, and communicates with the monitor terminal 120 or another device connected to the network 110 while converting the data format in the image analysis apparatus 100 and the data format (communication protocol) on the network 110.

(Operation of Image Analysis Apparatus)

Figure 4A:
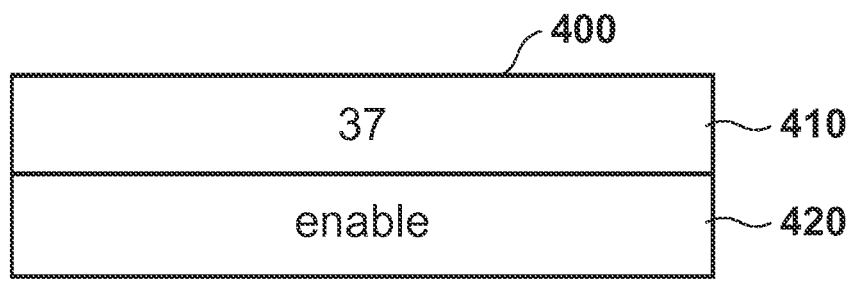
FIGS. 4A to 4C are views showing an example of output data of the image analysis unit.

FIG. 3 is a flowchart showing an example of the operation of the image analysis apparatus 100. The control unit 240 is a computer, and the flowchart of FIG. 3 represents a program to be executed by the control unit 240. The storage unit 250 stores the program such that the control unit 240 can read out it. FIG. 4A is a view showing an example of output data of the image analysis unit 230. A detailed function and operation of the image analysis apparatus 100 and, more particularly, the image analysis unit 230 will be described below with reference to FIGS. 3 and 4A. Note that as an object passage analysis method of analyzing in counting whether an object has passed, for example, a known method such as a background subtraction method is used, and a description thereof will be omitted.

When the image analysis apparatus 100 is activated, the image analysis unit 230 is also activated accordingly, and initialization is performed (step S300). At the same time, the control unit 240 controls the image acquisition unit 200 and the panhead 210 so that the image acquisition unit 200 and the panhead 210 set the capturing magnification and the capturing direction, respectively, to set values read out from the storage unit 250. The control unit 240 also initializes a storage area necessary for the operation out of the storage area of the storage unit 250. The storage area may hold the output data of the image analysis unit 230 shown in FIG. 4A.

As shown in FIG. 4A, output data 400 of the image analysis unit 230 includes a counting value 410 obtained by counting (totaling) object passages as an analysis result, and counting enable/disable information 420 representing whether analysis (counting) is enabled/disabled. The counting enable/disable information 420 represents a counting execution status indicating whether counting is progressing or has stopped. In FIG. 4A, the counting value 410 is "37", and the counting enable/disable information 420 is "enable" representing that counting is progressing. Note that by the initialization in step S300, the counting value 410 is set to a specific value "−1" representing that counting has not started yet, and the counting enable/disable information 420 is set to a specific value, for example, a character string "disable" or a numerical value "0" representing that counting has not started yet. Note that the output data 400 is referred to by the communication unit 260 as needed, and transmitted to the monitor terminal 120 under the control of the control unit 240 in response to an acquisition request from the user asynchronously to the operation of the flowchart in FIG. 3.

When the initialization has ended, the image analysis unit 230 transits to a standby state to wait for image input from the image acquisition unit 200 (step S310). Upon receiving an image from the image acquisition unit 200 (YES in step S310), the image analysis unit 230 determines whether it is a counting executable state (step S320).

When determining in step S320 whether it is a counting enable state, information of the current capturing magnification is acquired from the image acquisition unit 200, and information of the current capturing direction is acquired from the panhead 210. These pieces of information are compared with values stored in the storage unit 250. That is, the pieces of capturing range information obtained from the image acquisition unit 200 and the panhead 210 are compared with information of a predetermined capturing range stored in the storage unit 250 and used to execute counting. Note that the comparison and determination can be done by the control unit 240 or the image analysis unit 230.

The values are different if the capturing range is not the predetermined capturing range used to execute counting (NO in step S320), for example, the capturing range has been changed to another capturing range by a user operation. In this case, the process returns to step S310 to wait until the set values of the capturing magnification of the image acquisition unit 200 and the capturing direction of the panhead 210 return to the predetermined capturing range used to execute counting.

On the other hand, if the set values of the capturing magnification of the image acquisition unit 200 and the capturing direction of the panhead 210 match the values stored in the storage unit 250 (YES in step S320), counting starts (step S330). Note that in step S330, the counting value 410 of the output data 400 is set to a value "0", and the counting enable/disable information 420 is set to a specific value, for example, a character string "enable" or a numerical value "1" representing that counting has started. In the above-described way, when the image analysis apparatus 100 is initialized, the control unit 240 controls the image acquisition unit 200 and the panhead 210 such that the capturing magnification and the capturing direction are set to predetermined values, and waits for the start of counting until the capturing magnification and the capturing direction are set to the predetermined values. When the capturing magnification and the capturing direction are set to the predetermined values, and the capturing range is set to the predetermined capturing range for counting, the control unit 240 starts counting by the image analysis unit 230. Note that the condition of start counting is not limited to the setting of the capturing range to the predetermined range. Counting may start when another condition is satisfied, as will be described later.

The image analysis unit 230 performs object passage analysis for the input image and determines whether an object has passed (step S340). Upon determining that an object has passed, the passage count is added to the counting value 410 of the output data 400, thereby counting the number of objects that have passed (step S350). The control unit 240 stores, in the storage unit 250, the counting result after the capturing range has been set to the predetermined capturing range for counting. When processing of one input image has ended, the image analysis unit 230 transits to a standby state to wait for next image input (step S360). Upon receiving an image (YES in step S360), the image analysis unit 230 checks again whether it is the counting enable state (step S370). If counting is enabled (YES in step S370), the process returns to step S340 to repeat the counting processing. If counting is disabled (NO in step S370), the process advances to step S380 to stop counting. In this case, the output data 400 is initialized, like the initialization in step S300. After that, the process returns to step S310 to wait until the state returns to the counting enable state again.

With the above-described operation, the counting value 410 of the output data 400 is 0 or more only when capturing is being performed within the capturing range set as the capturing range used to count the number of object passages. This allows to determine only by the counting value 410 that the capturing is being performed within the set range. For this reason, the monitor terminal 120 need not separately be notified of the counting execution status indicating whether counting is progressing or has stopped. The counting execution status indicating whether counting is progressing or has stopped can also be determined by the value of the counting enable/disable information 420.

Note that the operation of this embodiment is not limited to that described above.

For example, whether counting is executable may be determined in step S320 based on information other then the capturing range or a combination thereof. For example, in a form in which a background subtraction method is used as the object passage analysis method, whether counting is executable is determined based on whether initialization of the background image has ended. That is, it may be determined whether image analysis by the image analysis unit 230 is executable. If analysis is executable, it may be determined that counting is executable. Alternatively, information about the illuminance of an object may be acquired from the image acquisition unit 200, and whether counting is executable may be determined based on whether the illuminance is equal to or higher than a predetermined illuminance at which an object can be detected.

If an explicit stop command is received from the user as an operation command from the monitor terminal 120 to the image analysis apparatus 100, it may determined that the image analysis apparatus 100 cannot execute counting. If a capturing range change instruction is input from the monitor terminal 120 to the image analysis apparatus 100, it may determined that the image analysis apparatus 100 cannot execute counting.

Figure 4B:
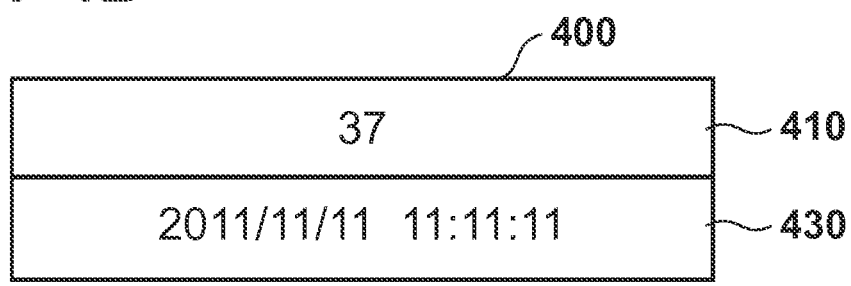

In the output data 400 of the image analysis unit 230, the counting enable/disable information 420 representing the counting execution status indicating whether counting is progressing or has stopped may be replaced with counting start time information 430, as shown in FIG. 4B.

In this embodiment, the output data 400 of the image analysis unit 230 includes the counting value 410 obtained by counting (totaling) object passages as an analysis result, and the counting start time information 430 representing the time when the analysis (counting) has started.

In this embodiment, by the initialization in step S300 of FIG. 3, the counting value 410 is set to a specific value "−1" representing that counting has not started yet, and the counting start time information 430 is set to a specific time, for example, "0001/1/1 00:00:00" representing that counting has not started yet. This time may be either a past time at which the operation of the system has obviously not started or a time in the distant future. When counting starts in step S330, in this embodiment, the counting value 410 of the output data 400 is set a value "0", and the counting start time information 430 is set to current time information representing the time at which the counting has started. Note that the control unit 240 counts the current time, and stores the time at which the counting has started in the storage unit 250 as the counting start time information 430. When the counting has stopped in step S380, in this embodiment, the output data 400 is initialized, like the initialization in step S300. Hence, a specific value representing that counting has not started yet is set in the counting start time information 430 that is information of the counting execution status indicating whether counting is progressing or has stopped.

In this embodiment, the time from which the counting is being performed can be obtained by the counting start time information 430. Hence, the monitor terminal 120 can know the timing at which the capturing range has changed (returned) to the set range without acquiring the output data 400 at a short interval. This allows the monitor terminal 120 to acquire an accurate counting result during the period without the change operation not at the timing of the capturing range change operation but at an arbitrary timing. Hence, the timing of the capturing range change operation is not restricted.

Note that as the information representing the counting execution status indicating whether counting is progressing or has stopped, the output data 400 may include the elapsed time from the counting start time in place of the counting start time information 430. This allows to obtain a correct counting time even if a time lag exists between timepiece in the image analysis apparatus 100 and that in the monitor terminal 120.

In a modification of the embodiment, the elapsed time is used as the information representing the counting execution status. In addition, even when counting is disabled, the counting value 410 and the elapsed time from the counting start are saved in step S380 without initializing the output data 400 (as the elapsed time, the time at which the counting has stopped is maintained). When counting is enabled again, the number of times of object passage detection after the measurement has been resumed is added to the saved counting value 410. Note that in this case, the elapsed time is the total counting execution time, that is, the total elapsed time excluding the period of stop. As the counting execution status indicating whether counting is progressing or has stopped, the total counting stop time may be used in place of the counting start time information 430. This is because if the total stop time is known when the monitor terminal 120 has instructed the image analysis apparatus 100 to start counting, the total measurement time can also be known.

Figure 4C:
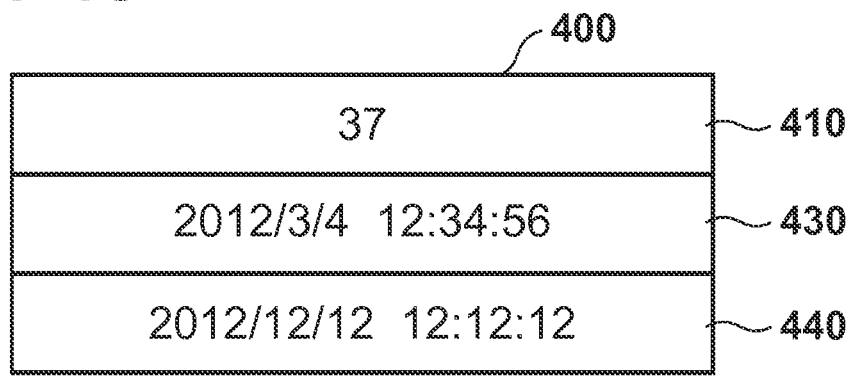

Alternatively, as shown in FIG. 4C, the output data 400 may include counting stop time information 440 representing the time of counting stop in addition to the counting start time information 430. This allows to determine whether counting is progressing even when the counting is disabled, and the counting value at that point of time is saved without initializing the counting value 410. The monitor terminal 120 can know the counting result for the period when the measurement could be performed accurately. Note that when the counting is being executed, the counting stop time information 440 representing the time of the counting step has a predetermined value. For example, a time before the counting start time may be input as the counting stop time information 440. Alternatively, at the start of counting, the output data 400 may include only the start time, as shown in FIG. 4B. When the counting has stopped, the counting stop time information 440 representing the time of the stop may be added, as shown in FIG. 4C. When the counting has been resumed, the counting start time information 430 is updated to the counting resumption time, and the counting value 410 is initialized. At this time, the counting stop time information 440 may be initialized.

The image analysis apparatus 100 may include an initialization determination unit to initialize the output data 400 independently of the counting stop. For example, the initialization determination unit may determine to initialize the output data 400 in accordance with detection of a change in the settings concerning image analysis. More specifically, the initialization determination unit may determine to perform initialization when, for example, the setting of a condition concerning the position to determine an object passage has been changed. In this case, the counting is not stopped, and when an object passage ha been determined after the initialization, the output data 400 is updated from the initial value "0". The initialization determination unit may also determine to perform initialization when an explicit initialization command is received from the user as an operation command from the monitor terminal 120 to the image analysis apparatus 100.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-012435 filed on Jan. 24, 2012, which is hereby incorporated by reference herein in its entirety.

What is claimed is:

1. An analysis apparatus for analyzing an image captured by a capturing unit and performing counting of object passages, comprising:
   an execution unit configured to execute the counting of object passages;
   a control unit configured to control at least one of a direction and a magnification of the capturing unit;
   a determination unit configured to determine whether or not at least one of a current direction and a current magnification of the capturing unit controlled by the control unit matches respective predetermined values to cover a capturing range of the capturing unit within which the counting of object passages is executed;
   an updating unit configured to update an execution status of the counting of object passages based on a result of the determination unit; and
   an output unit configured to output the execution status of the counting of object passages by said execution unit,
   wherein at least one of the execution unit, the determination unit, the updating unit and the output unit is implemented by a processor.

2. The apparatus according to claim 1, wherein said output unit outputs the execution status representing whether the counting of object passages is progressing or has stopped.

3. The apparatus according to claim 1, further comprising a setting unit configured to set, in accordance with a stop of the counting of object passages by said execution unit, a counting value to a value representing that the counting of object passages has stopped.

4. The apparatus according to claim 1, further comprising:
   a storage unit configured to store a start time of the counting of object passages by said execution unit; and
   a reset unit configured to reset the start time when the counting of object passages by said execution unit has been stopped,
   wherein said output unit outputs the start time as the execution status of the counting of object passages.

5. The apparatus according to claim 1, wherein said output unit outputs a stop time of the counting of object passages by said execution unit as the execution status of the counting of object passages.

6. An analysis apparatus for analyzing an image captured by a capturing unit and performing counting of object passages, comprising:
   an execution unit configured to execute the counting of object passages;
   a control unit configured to control at least one of a direction and a magnification of the capturing unit;
   a determination unit configured to determine whether or not at least one of a current direction and a current magnification of the capturing unit controlled by the control unit matches respective predetermined values to cover a capturing range of the capturing unit within which the counting of object passages is executed;
   an updating unit configured to update an execution status of the counting of object passages based on a result of the determination unit; and
   a holding unit configured to hold the execution status of the counting of object passages by said execution unit,
   wherein at least one of the execution unit, the determination unit, the updating unit and the holding unit is implemented by a processor.

7. The apparatus according to claim 6, wherein said holding unit holds the execution status representing whether the counting is progressing or has stopped.

8. The apparatus according to claim, further comprising:
   a second output unit configured to output an elapsed time from start of the counting of object passages by said execution unit.

9. The apparatus according to claim 8, wherein said second output unit outputs the elapsed time from the start of the counting of object passages by said execution unit, which does not include a stop period of the counting of object passages by said execution unit.

10. The apparatus according to claim 1, further comprising:
    a second output unit configured to output an elapsed time from stop of the counting of object passages by said execution unit.

11. An analysis method of analyzing an image captured by a capturing unit and performing counting of object passages, comprising:
    executing the counting of object passages;
    determining whether or not at least one of a current direction and a current magnification of the capturing unit controlled by a control unit, which controls at least one of a direction and a magnification of the capturing unit, matches respective predetermined values to cover a capturing range of the capturing unit within which the counting of object passages is executed;
    updating an execution status of the counting of object passages based on a result of the determination; and
    outputting the execution status of the counting of object passages.

12. The method according to claim 11, wherein in the outputting, the execution status representing whether the counting of object passages is progressing or has stopped is output.

13. A non-transitory storage medium storing a computer program that causes a computer to perform analysis processing of analyzing an image captured by the capturing unit and performing counting object passages, comprising:
    executing the counting of object passages;
    determining whether or not at least one of a current direction and a current magnification of the capturing unit controlled by a control unit, which controls at least one of a direction and a magnification of the capturing unit, matches respective predetermined values to cover a capturing range of the capturing unit within which the counting of object passages is executed;
    updating an execution status of the counting of object passages based on a result of the determination; and
    outputting the execution status of the counting of object passages.

14. The non-transitory storage medium according to claim 13, wherein in the outputting, the execution status representing whether the counting of object passages is progressing or has stopped is output.

* * * * *